United States Patent
Abe et al.

(10) Patent No.: US 9,378,625 B2
(45) Date of Patent: Jun. 28, 2016

(54) GAMING MACHINE WITH SOUND OUTPUT FOR SPECIFIC SYMBOL AND CONTROL METHOD THEREOF

(75) Inventors: Taihei Abe, Koto-ku (JP); Koutarou Moriyama, Koto-ku (JP); Toshiaki Ohkubo, Tokyo (JP); Shigeki Hayashi, Koto-ku (JP); Yuka Hotta, Koto-ku (JP); Tsuyoshi Ohira, Koto-ku (JP); Hiroki Abe, Koto-ku (JP); Takanori Sakata, Koto-ku (JP)

(73) Assignee: ARUZE GAMING AMERICA, INC., Las Vegas, NV (US)

( * ) Notice: Subject to any disclaimer, the term of this patent is extended or adjusted under 35 U.S.C. 154(b) by 1182 days.

(21) Appl. No.: 12/566,215

(22) Filed: Sep. 24, 2009

(65) Prior Publication Data

US 2010/0087242 A1 Apr. 8, 2010

Related U.S. Application Data

(60) Provisional application No. 61/103,679, filed on Oct. 8, 2008.

(51) Int. Cl.
*G07F 17/34* (2006.01)
*G07F 17/32* (2006.01)
*A63F 13/54* (2014.01)

(52) U.S. Cl.
CPC .......... *G07F 17/34* (2013.01); *G07F 17/3227* (2013.01); *A63F 13/54* (2014.09); *A63F 2300/6063* (2013.01)

(58) Field of Classification Search
CPC ............... G07F 17/34; G07F 17/3227; A63F 2300/6081; A63F 13/54; A63F 2250/027; A63F 2300/6063
USPC ........................................... 463/35
See application file for complete search history.

(56) References Cited

U.S. PATENT DOCUMENTS

| | | | | |
|---|---|---|---|---|
| 5,695,188 | A * | 12/1997 | Ishibashi | 273/143 R |
| 2004/0084844 | A1 | 5/2004 | Adams | |
| 2005/0164786 | A1 * | 7/2005 | Connelly | 463/35 |
| 2008/0108411 | A1 | 5/2008 | Jensen et al. | |
| 2008/0214282 | A1 * | 9/2008 | Inoue | 463/20 |
| 2010/0062827 | A1 * | 3/2010 | Hoffman et al. | 463/20 |

* cited by examiner

*Primary Examiner* — Werner Garner
(74) *Attorney, Agent, or Firm* — Lex IP Meister, PLLC

(57) ABSTRACT

A slot machine has a display on which symbols are rearranged in partitioned regions arranged in multiple columns and rows. The display has multiple display windows corresponding to the respective columns for each unit game. In each of the display windows, symbols are rearranged by executing video display in which a symbol column having multiple symbols is scrolled in an arrangement direction of the symbols. When a symbol rearranged in at least one partitioned region in at least one of the symbol columns already stopped from scrolling forms a pattern just before winning combination establishment in which the rearranged symbol requires a specific symbol in at least one other symbol column in scrolling, a passing sound of the specific symbol is outputted from a speaker in synchronization with a timing at which the specific symbol in the symbol column in scrolling passes through the display window.

8 Claims, 10 Drawing Sheets

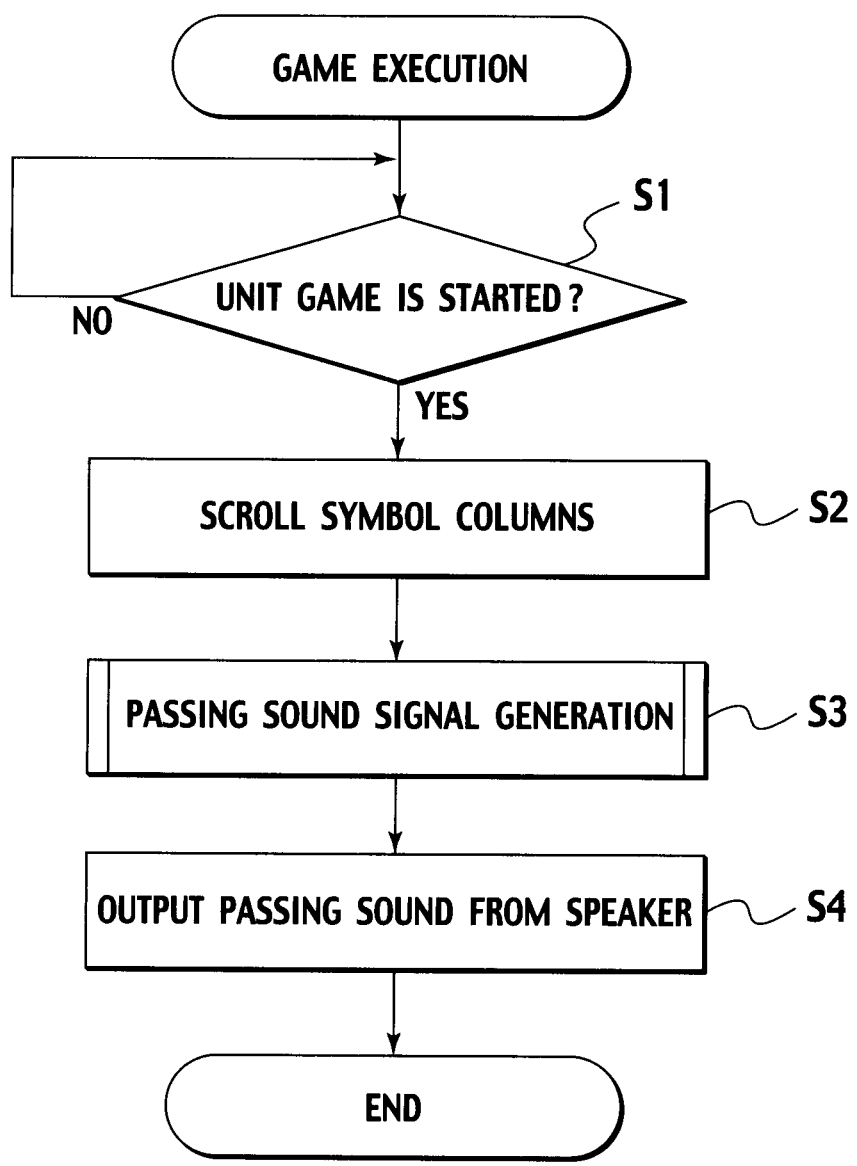

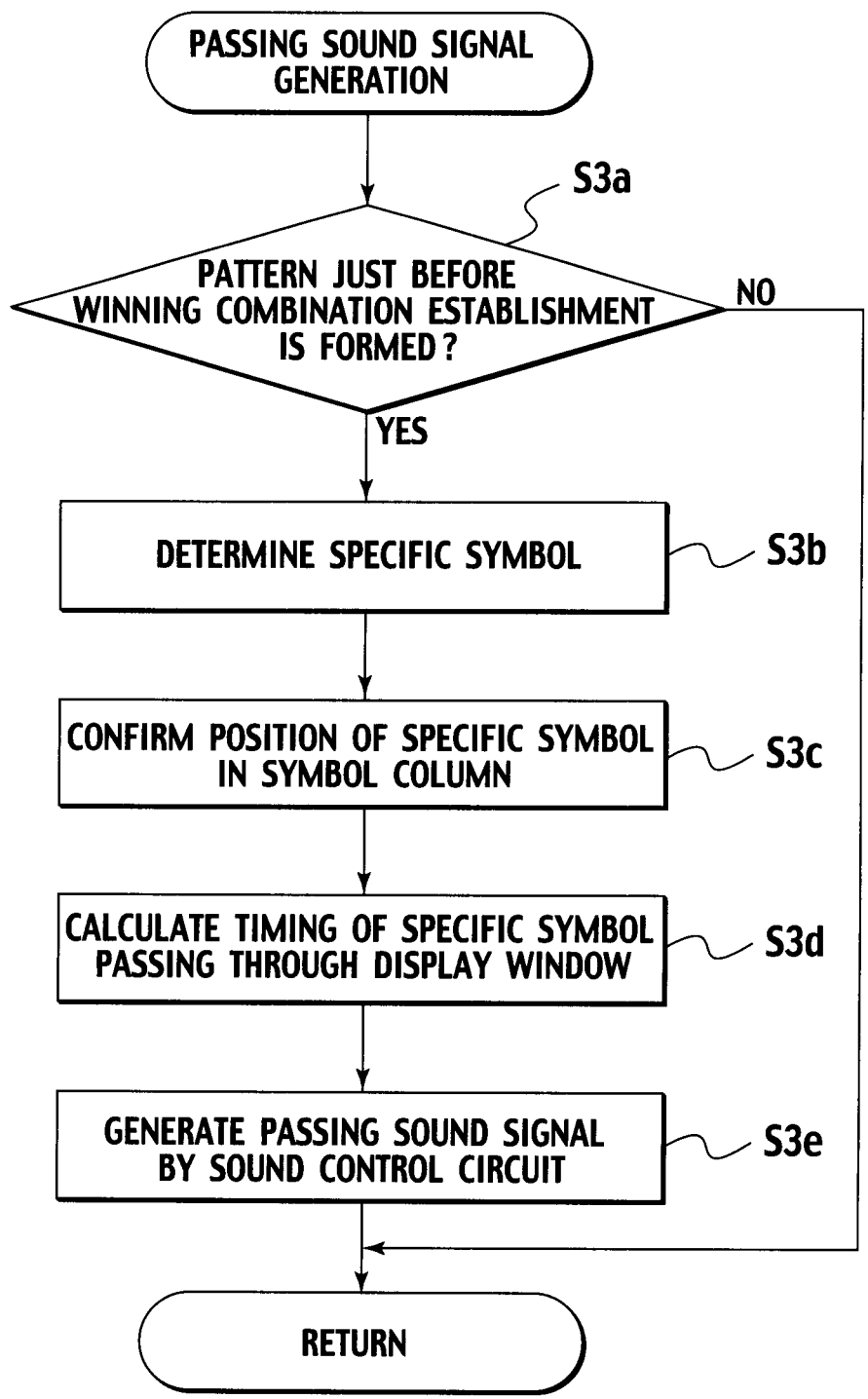

FIG. 3

|  | COLUMN 1 | COLUMN 2 | COLUMN 3 | COLUMN 4 | COLUMN 5 |
|---|---|---|---|---|---|
| ROW 1 | q11 | q21 | q31 | q41 | q51 |
| ROW 2 | q12 | q22 | q32 | q42 | q52 |
| ROW 3 | q13 | q23 | q33 | q43 | q53 |
| ROW 4 | q14 | q24 | q34 | q44 | q54 |

| J | A | FEATURE | A | K |
|---|---|---|---|---|
| 10 | Q | J | ☂ | ♣ |
| WILD | K | A | Q | ☂ |
| Q | ♣ | K | J | A |

16a  16b  16c  16d  16e 16a  16b  16c  16d  16e 16a  16b  16c  16d  16e

GAMING MACHINE WITH SOUND OUTPUT FOR SPECIFIC SYMBOL AND CONTROL METHOD THEREOF

CROSS REFERENCE TO RELATED APPLICATIONS

This application claims priority to U.S. provisional patent application Ser. No. 61/103,679 filed on Oct. 8, 2008, and which is incorporated by reference herein for all purposes.

BACKGROUND OF THE INVENTION

1. Field of the Invention

The present invention relates to a gaming machine for arranging and rearranging symbols in display windows of a display for each unit game by executing video display in a mode of scrolling and stopping symbol arrays in an arrangement direction of the symbols, the symbol arrays having a plurality of the symbols arranged, and also relates to a control method thereof.

2. Description of the Related Art

US Patent Application Publication No. 2004/0084844 discloses a gaming machine for displaying, on a display, a card game in which a WILD card is dealt in a unit game. In this gaming machine, the dealt WILD card can be used as a card advantageous to a player. Generally, if combining the WILD card with other dealt cards different from the WILD card brings the winning of an award or a higher award to the player, the WILD card is used as a card necessary for the winning.

Moreover, US Patent Application Publication No. 2008/0108411 discloses a slot machine for performing, on a display, arrangement and rearrangement of symbols in a unit game by rotating and stopping reels. In this slot machine, when a WILD symbol on the reel is rearranged on the display, the WILD symbol is regarded as a symbol advantageous to a player. Generally, if combining the WILD card with other rearranged symbols different from the WILD symbol brings the winning of an award or a higher award to the player, the WILD symbol is used as a symbol necessary for the winning.

In the conventional gaming machines described above, when the WILD symbol is rearranged in the unit game, an award or a higher award is more likely to be won.

There has been desired a gaming machine having new entertainment properties compared with the conventional gaming machines as described above.

SUMMARY OF THE INVENTION

It is an object of the present invention to provide a gaming machine configured to rearrange arranged symbols for each unit game, and a control method thereof, which are capable of providing new entertainment properties by attracting more attention of a player to whether or not a specific symbol among symbols is rearranged in the gaming machine.

A first aspect of the present invention is a gaming machine comprising: a display configured to display a video in a mode of scrolling and stopping a variable subsequence of a sequence of symbols for a symbol rearrangement in a display window in a respective unit game; a speaker configured to output a passing sound of a symbol during scrolling of the variable subsequence of symbols; a sound control circuit configured to generate a signal of the passing sound to be outputted from the speaker; and a controller configured to (a) drive the sound control circuit to generate the signal of the passing sound according to a timing at which a specific symbol of the sequence of symbols passes through the display window during scrolling of the variable subsequence of symbols in the respective unit game, and (b) drive the speaker to output the passing sound in synchronization with the timing at which the specific symbol passes through the display window, in response to the signal of the passing sound generated by the sound control circuit during scrolling of the variable subsequence of symbols in the respective unit game.

A second aspect of the present invention is a gaming machine comprising: a display configured to display a video in a mode of scrolling and stopping a variable subsequence of a sequence of symbols for a symbol rearrangement in a display window in a respective unit game; a speaker configured to output a passing sound of a symbol during scrolling of the variable subsequence of symbols; a sound control circuit configured to generate a signal of the passing sound to be outputted from the speaker; and a controller configured to (a) determine a specific symbol among symbols of the sequence for the respective unit game, (b) drive the sound control circuit to generate the signal of the passing sound according to a timing at which the specific symbol of the variable subsequence of symbols determined for the respective unit game passes through the display window during scrolling of the variable subsequence of symbols in the respective unit game, and (c) drive the speaker to output the passing sound in synchronization with the timing at which the specific symbol determined for the respective unit game passes through the display window, in response to the signal of the passing sound generated by the sound control circuit during scrolling of the variable subsequence of symbols in the respective unit game.

A third aspect of the present invention is a gaming machine comprising: a display configured to display a video in a mode of scrolling and stopping respective variable subsequences of sequences of symbols in respective display windows for a symbol rearrangement in the display windows in a respective unit game; a speaker configured to output a passing sound of a symbol during scrolling of the respective variable subsequences of symbols; a sound control circuit configured to generate a signal of the passing sound to be outputted from the speaker; and a controller configured to (a) display a video in a mode of stopping variable subsequences of the sequences of symbols at different timings from each other for a symbol rearrangement of symbols arranged in the display windows in a respective unit game, (b) when symbols having been stopped in a first display window in a video display in a mode of having stopped a first variable subsequence of symbols in the first display window while scrolling a second variable subsequence of symbols in a second display window in the respective unit game forms a winning pattern along with any of symbols belonging to a predetermined symbol group upon the any of the symbols belonging to the predetermined symbol group being stopped in the second display window, determine one of the symbols belonging to the predetermined symbol group to be a specific symbol for the respective unit game, the determined one of the symbols forming a pattern to establish a highest winning award when the determined one of the symbols is rearranged in the second display window, (c) drive the sound control circuit to generate the signal of the passing sound according to a timing at which the specific symbol of the second variable subsequence of symbols determined for the respective unit game passes through the second display window during scrolling of the second variable subsequence of symbols in the respective unit game, and (d) drive the speaker to output the passing sound in synchronization with the timing at which the specific symbol of the second variable subsequence of symbols determined for the respective unit game passes through the second display window, in response to the signal of the passing sound generated by the sound control circuit during scrolling of the second variable subsequence of symbols in the respective unit game.

A fourth aspect of the present invention is a method for controlling a gaming machine that displays a video in a mode of scrolling and stopping a variable subsequence of a sequence of symbols for a symbol rearrangement in a display window of a display in a respective unit game, the method comprising: driving a sound control circuit to generate a signal of a passing sound of a specific symbol of the sequence of symbols during scrolling of the variable subsequence of symbols according to a timing at which the specific symbol passes through the display window during scrolling of the variable subsequence of symbols in the respective unit game; and driving a speaker to output the passing sound in synchronization with the timing at which the specific symbol passes through the display window, in response to the signal of the passing sound generated by the sound control circuit during scrolling of the variable subsequence of symbols in the respective unit game.

BRIEF DESCRIPTION OF THE DRAWINGS

FIG. 1A is a flowchart schematically showing a procedure of processing executed by a slot machine according to an embodiment of the present invention.

FIG. 1B is a flowchart schematically showing a procedure of processing executed by the slot machine according to the embodiment of the present invention.

FIG. 3 is an explanatory view showing partitioned regions in a matrix pattern provided on a display on the slot machine according to the embodiment of the present invention.

FIG. 4 is an explanatory view showing a display example displayed on the display on the slot machine according to the embodiment of the present invention.

DETAILED DESCRIPTION OF THE EMBODIMENT

Figure 2:
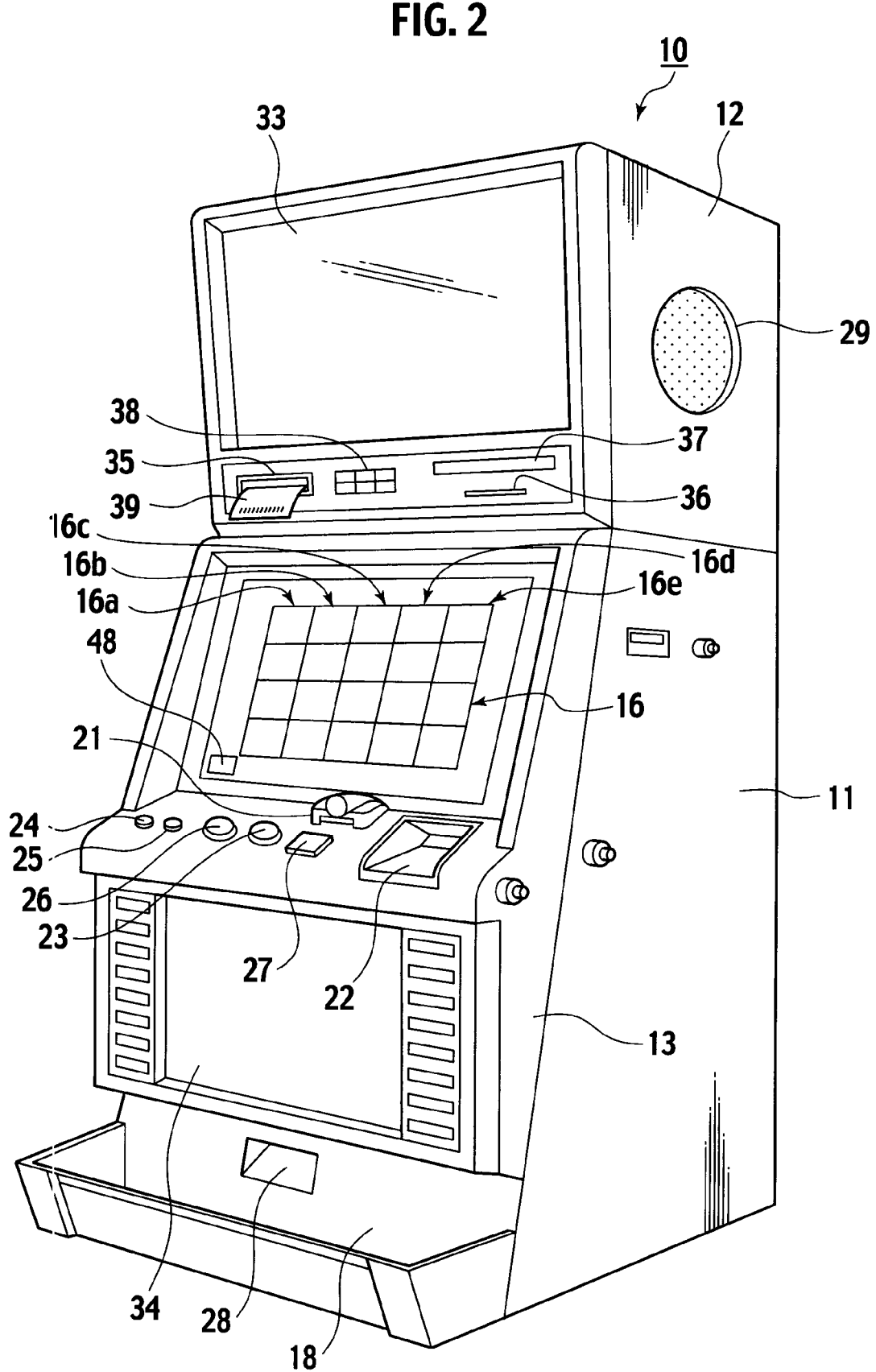
FIG. 2 is a perspective view of the slot machine according to the embodiment of the present invention.
Figure 5A:
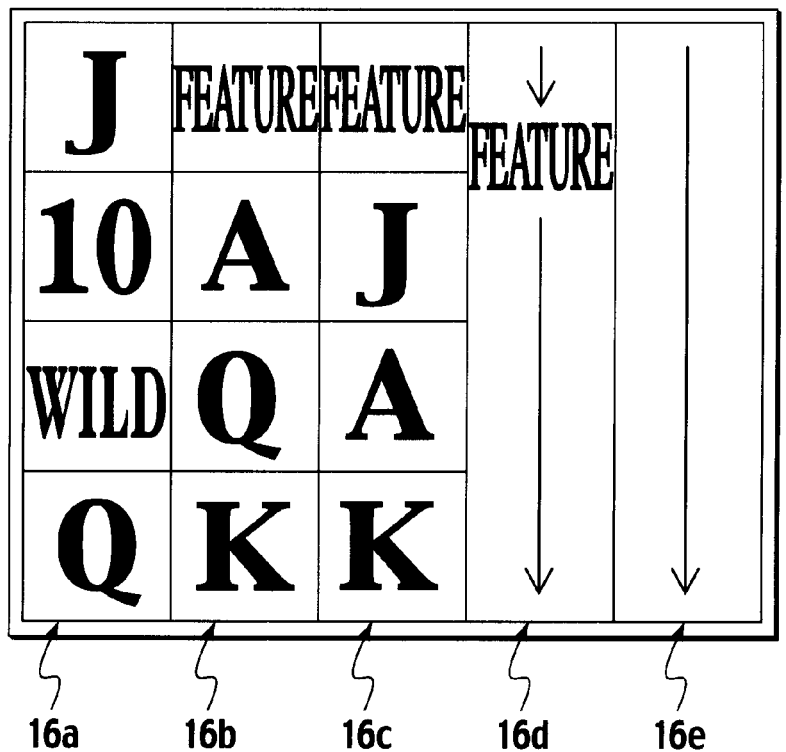
FIG. 5A is an explanatory view showing a display example displayed on the display on the slot machine according to the embodiment of the present invention.
Figure 5B:
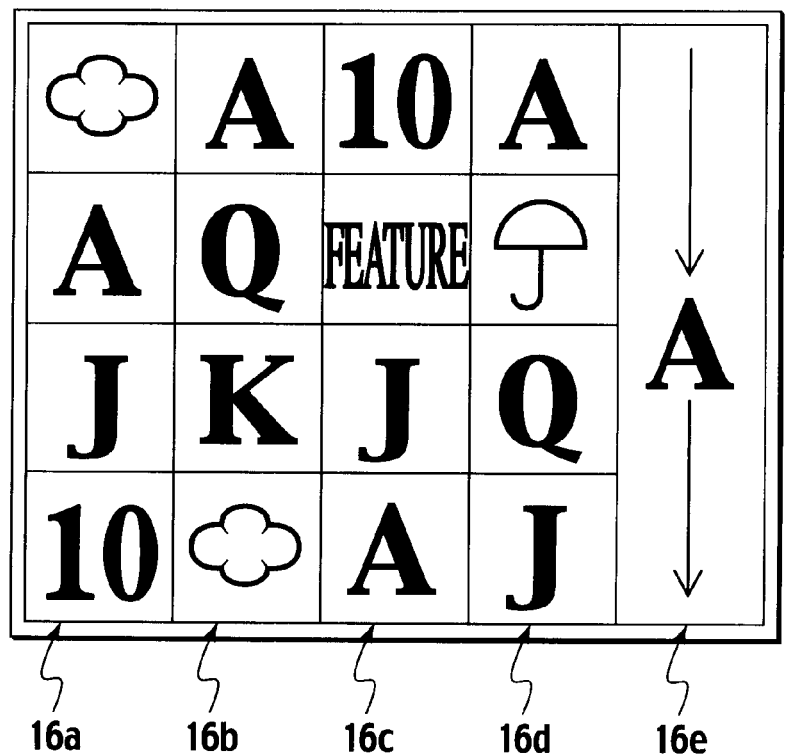
FIG. 5B is an explanatory view showing a display example displayed on the display on the slot machine according to the embodiment of the present invention.
Figure 5C:
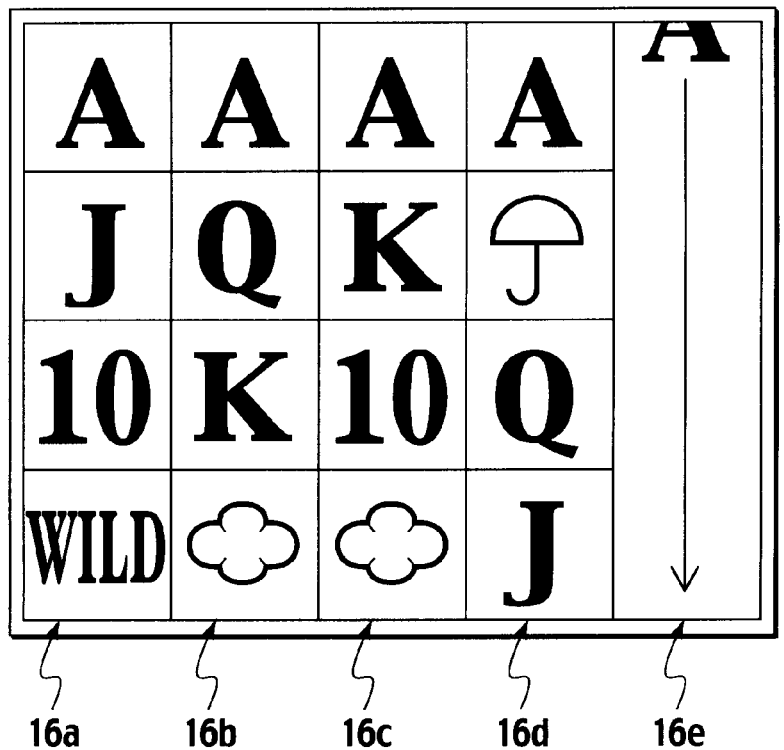
FIG. 5C is an explanatory view showing a display example displayed on the display on the slot machine according to the embodiment of the present invention.
Figure 5D:
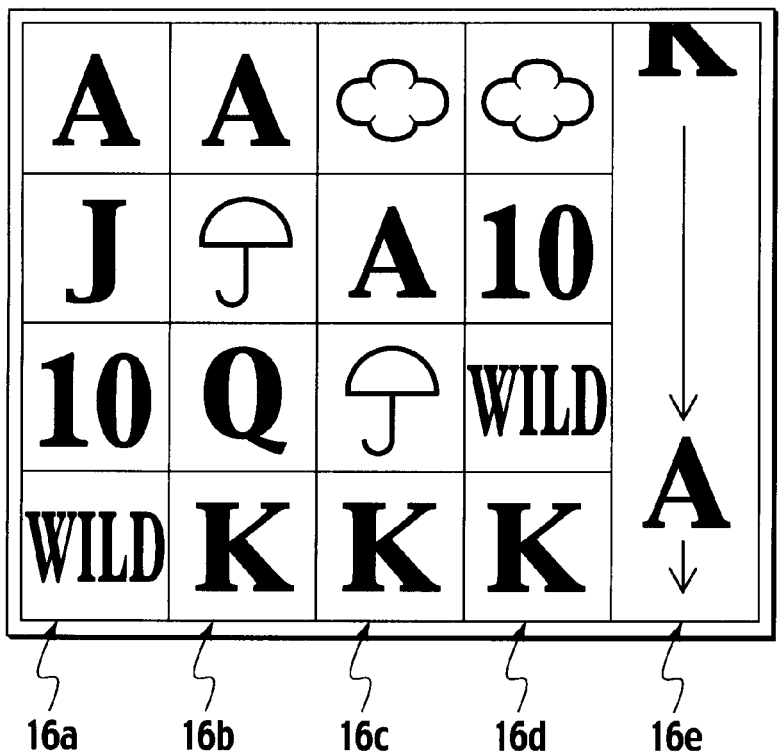
FIG. 5D is an explanatory view showing a display example displayed on the display on the slot machine according to the embodiment of the present invention.
Figure 6:
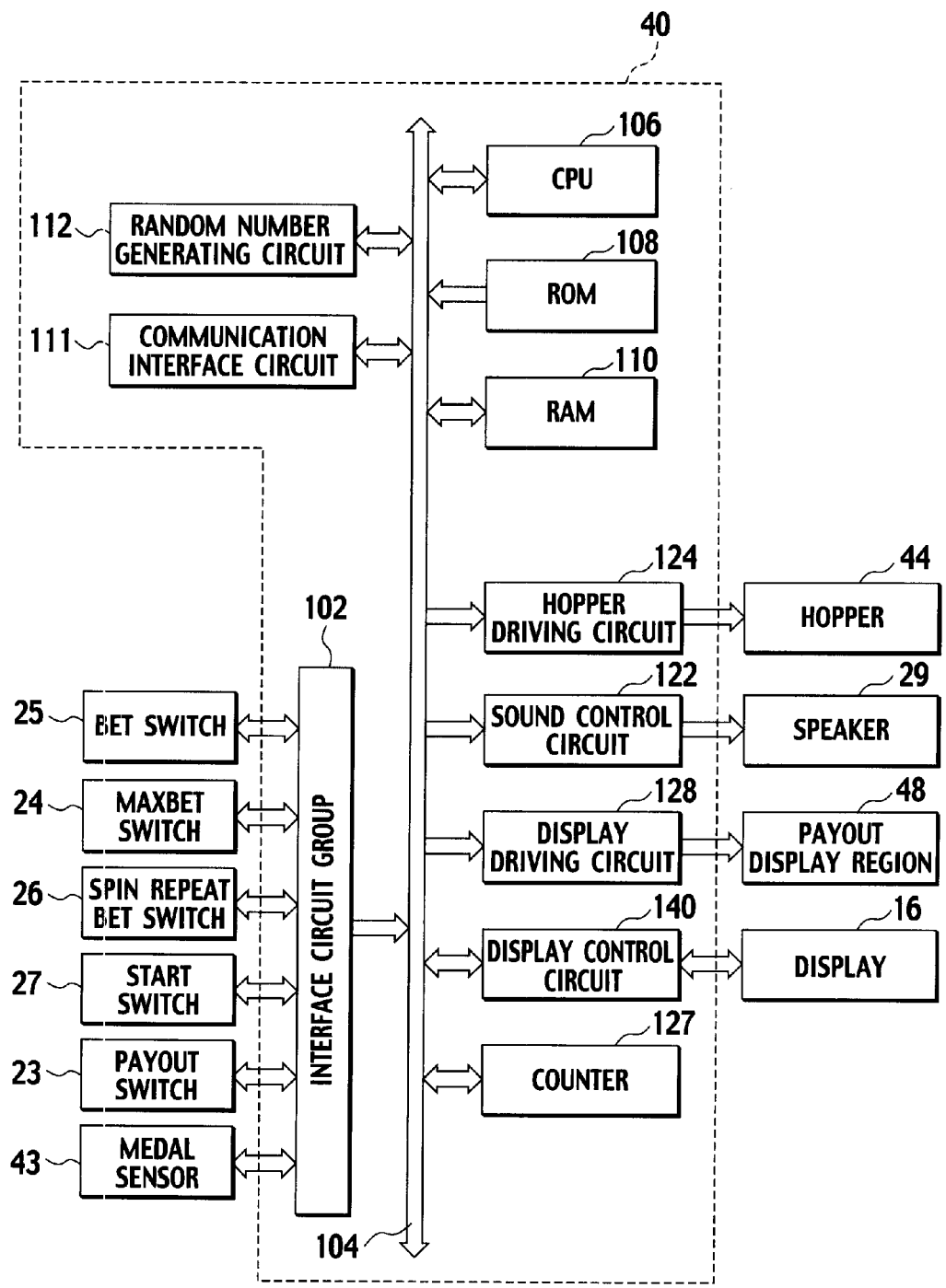
FIG. 6 is a block diagram showing a control circuit in the slot machine according to the embodiment of the present invention.

With reference to FIGS. 1A, 1B, 2, 3, 4, 5A, 5B, 5C, 5D and 6, outline will be given below of operations and a control method of a slot machine according to an embodiment of the present invention, which is an example of a gaming machine according to the present invention. FIGS. 1A and 1B are flowcharts schematically showing a procedure of processing executed by the slot machine according to the embodiment of the present invention. FIG. 2 is a perspective view of the slot machine according to the embodiment of the present invention. FIG. 3 is an explanatory view showing partitioned regions in a matrix pattern provided on a display on the slot machine according to the embodiment of the present invention. FIG. 4 is an explanatory view showing a display example displayed on the display on the slot machine according to the embodiment of the present invention. FIG. 5A is an explanatory view showing a display example displayed on the display on the slot machine according to the embodiment of the present invention. FIG. 5B is an explanatory view showing a display example displayed on the display on the slot machine according to the embodiment of the present invention. FIG. 5C is an explanatory view showing a display example displayed on the display on the slot machine according to the embodiment of the present invention. FIG. 5D is an explanatory view showing a display example displayed on the display on the slot machine according to the embodiment of the present invention. FIG. 6 is a block diagram showing a control circuit in the slot machine according to the embodiment of the present invention.

On a front surface of a cabinet 11 of a slot machine 10 shown in FIG. 2, a display 16 (equivalent to a display of the present invention) is provided. The display 16 has twenty partitioned regions q11 to q54 as shown in FIG. 3. These partitioned regions q11 to q54 are arranged in a matrix pattern including first to fifth columns and first to fourth rows.

In the slot machine 10 shown in FIG. 2, when credits are bet on a unit game and a start switch 27 is operated, the unit game is executed. Every time the unit game is played, symbols arranged in the partitioned regions q11 to q54 shown in FIG. 3 described above are rearranged. Various effect sounds related to the unit game are outputted from a speaker 29.

The symbols are rearranged for each of first to fifth display windows 16a to 16e on the display 16 shown in FIG. 2, the display windows corresponding to the first to fifth columns shown in FIG. 3, respectively. The rearrangement of the symbols in each of the display windows 16a to 16e can be executed by performing, in each of the display windows 16a to 16e on the display 16, video display in a mode of scrolling and stopping symbol arrays in an arrangement direction of the symbols, the symbol arrays having a plurality of the symbols arranged therein.

The symbol to be rearranged in each of the partitioned regions q11 to q54 shown in FIG. 3 is any one of nine kinds of symbols shown in FIG. 4, including, for example, "A (ace)," "K (king)," "Q (queen)," "J (jack)," "10," "umbrella," "cloud," "FEATURE" and "WILD." Here, a combination of symbols selected from these nine kinds of symbols is arranged in the respective symbol array in a predetermined order as a sequence of symbols. And some symbols of the respective symbol array are displayed in a mode of scrolling and stopping in each of first to fifth display windows 16a to 16e as a subsequence of the sequence of symbols.

When the symbols are rearranged in the partitioned regions q11 to q54, respectively, in the unit game, the number of credits to be provided as a payout is determined according to rules of a predetermined payout table. Thereafter, a payout for the determined number of credits is provided. Subsequently, the symbols in the respective partitioned regions q11 to q54 are rearranged as the next unit game is started.

Whether or not to provide a payout or how many credits to be provided as a payout in the unit game is determined differently between the case where the slot machine 10 shown in FIG. 2 is one that executes a scatter type unit game and the case where the slot machine 10 shown in FIG. 2 is one that executes a winning combination type unit game.

In the case where the slot machine 10 shown in FIG. 2 is the one that executes the scatter type unit game, when a predetermined number or more of scatter symbols of the same kind are rearranged in the partitioned regions q11 to q54, a payout for the number of credits corresponding to the kinds of the scatter symbols and the number of the scatter symbols rearranged is generated as a payout for the unit game.

Moreover, in the case where the slot machine 10 is the one that executes the winning combination type unit game, when a winning combination is formed on a payline set in the partitioned regions q11 to q54, a payout for the number of credits corresponding to contents of the winning combination formed is generated as a payout for the unit game.

When being rearranged in any of the partitioned regions q11 to q54, each of the symbols "WILD" and "FEATURE" is handled in the same manner regardless of whether the unit game to be executed by the slot machine 10 shown in FIG. 2 is the scatter type or the winning combination type.

When a "WILD" symbol is rearranged in any of the partitioned regions q11 to q54, the "WILD" symbol can be regarded as a desired symbol among the other seven kinds of symbols except "FEATURE." Whether or not an award is won by the symbols rearranged in the partitioned regions q11 to q54 is determined after the rearranged "WILD" symbol is regarded as the desired symbol.

Moreover, for example, when "FEATURE" symbols are rearranged in the partitioned regions in the same row in three or more consecutive display windows among the first to fifth display windows 16a to 16e, a pattern of a feature game trigger is formed. Thus, a condition for starting a feature game can be considered to be established. The number of feature games to be executed in such a case can be determined, for example, by an option selection operation to be performed by a player at the start of the feature game.

In the slot machine 10 according to the embodiment of the present invention described above, as shown in FIG. 1A, first, when a unit game is started by operating the start switch 27 shown in FIG. 2 (YES in Step S1), the symbol columns are scrolled in the first to fifth display windows 16a to 16e shown in FIG. 2 to rearrange the symbols (Step S2). Thereafter, a sound control circuit 122 (see FIG. 6) in the slot machine 10 generates a signal of a passing sound of a specific symbol passing the display window during the scrolling of the symbol columns (Step S3).

The generation of the passing sound by the sound control circuit 122 in Step S3 can be performed by procedures shown in FIG. 1B, for example. First, it is determined whether or not a rearrangement pattern of the symbol rearranged in at least one of the partitioned regions q11 to q54 is a pattern just before winning combination establishment such that a winning combination is established when a desired symbol is rearranged in at least another partitioned region in which a symbol is yet to be rearranged (Step S3a).

The pattern just before winning combination establishment described above is a pattern as shown in FIG. 5A, for example, that is, a pattern in which "FEATURE" symbols are rearranged in the partitioned regions q21 and q31 in the same row in the second and third display windows 16b and 16c in a state where scrolling of the symbol columns in the first to third display windows 16a to 16c (at least one symbol column) is stopped and the symbol columns in the fourth and fifth display windows 16d and 16e (at least one other symbol column) are currently scrolling.

Thereafter, when the symbol column in scrolling in the fourth display window 16d is stopped and a "FEATURE" symbol is rearranged in the partitioned region q41 in the same row as the second and third display windows 16b and 16c, a pattern to meet conditions for starting a feature game (a pattern to establish a winning combination) is formed.

Moreover, a pattern just before winning combination establishment in the slot machine 10 of the scatter type is a pattern including rearranged symbols in at least one symbol column already stopped from scrolling, the rearranged symbols including scatter symbols just one short of a predetermined number to meet winning combination establishment conditions.

For example, as shown in FIG. 5B, the pattern just before winning combination establishment is formed when four "A (ace)" symbols as scatter symbols are rearranged in the partitioned regions q11 to q44 in the first to fourth display windows 16a to 16d in a state where the symbol columns in the first to fourth display windows 16a to 16d (at least one symbol column) is stopped from scrolling while the symbol column in the fifth display window 16e (at least one other symbol column) is currently scrolling.

Thereafter, when the symbol column in scrolling in the fifth display window 16e is stopped and one more "A (ace)" symbol is rearranged in any of the partitioned regions q51 to q54, the number of the rearranged scatter symbols reaches five (the predetermined number) and the pattern to establish a winning combination is formed.

Furthermore, a pattern just before winning combination establishment in the slot machine 10 of the winning combination type is a pattern including rearranged symbols in four symbol columns already stopped from scrolling, the rearranged symbols needing one more desired symbol to be rearranged on an active payline to establish a winning combination.

For example, as shown in FIG. 5C, the pattern just before winning combination establishment is formed when the same symbols (in the case of FIG. 5C, "A (ace)" symbols) are rearranged in the partitioned regions q11 to q41 in the first to fourth display windows 16a to 16d positioned on a payline set in the first row in a state where the symbol columns in the first to fourth display windows 16a to 16d (at least one symbol column) is stopped from scrolling while the symbol column in the fifth display window 16e (at least one other symbol column) is currently scrolling.

Thereafter, when the symbol column in scrolling in the fifth display window 16e is stopped and the same symbol ("A (ace)" symbol) is rearranged in the partitioned region q51 positioned on the same payline, a winning combination is established and the pattern to establish the winning combination is formed.

When the pattern just before winning combination establishment is formed (YES in Step S3a), a symbol required to be rearranged to establish the winning combination by stopping the symbol column in scrolling is determined to be a specific symbol (Step S3b).

For example, in the pattern just before winning combination establishment shown in FIG. 5A, the "FEATURE" symbol is determined to be the specific symbol. In the slot machine 10 of the scatter symbol type, scatter symbols just one short of a predetermined number which have been rearranged are determined to be the specific symbols. Moreover, in the slot machine 10 of the winning combination type, a desired symbol, one more of which is required to be rearranged on an active payline, is determined to be the specific symbol. Therefore, for example, in both of the patterns just before winning combination establishment shown in FIGS. 5B and 5C, the "A (ace)" symbol is determined to be the specific symbol.

Note that, in the slot machine 10 of the winning combination type, when the symbols corresponding to the pattern just before winning combination establishment are rearranged on two or more active paylines, a plurality of kinds of desired symbols may occur. In this event, a symbol to achieve a highest payout (a highest winning award) if a winning combination is established may be determined to be the specific symbol.

For example, in the pattern shown in FIG. 5D, in a state where the symbol columns in the first to fourth display windows 16a to 16d (at least one symbol column) is stopped from scrolling while the symbol column in the fifth display window 16e (at least one other symbol column) is currently scrolling, two patterns just before winning combination establishment including "WILD" symbols are simultaneously formed.

One of the two patterns just before winning combination establishment is a pattern formed by "A (ace)" symbols, which is formed in the partitioned regions q11 to q41 in the first to fourth display windows 16a to 16d positioned on a V-shaped payline while including a "WILD" symbol rearranged in the fourth display window 16d. The other one is a pattern formed by "K (king)" symbols, which is formed in the partitioned regions q14 to q44 in the first to fourth display windows 16a to 16d positioned on a payline set in the fourth row while including a "WILD" symbol rearranged in the first display window 16a.

In the pattern shown in FIG. 5D, thereafter, when the symbol column in scrolling in the fifth display window 16e is stopped and the "A (ace)" symbol is rearranged in the partitioned region q51 positioned on the V-shaped payline or the "K (king)" symbol is rearranged in the partitioned region q54 positioned on the payline in the fourth row, a winning combination is established and the pattern to establish a winning combination is formed. Specifically, the two "A (ace)" and "K (king)" symbols belong to a predetermined symbol group hopefully expected to be subsequently rearranged in the partitioned regions in the fifth display window 16e.

Here, as to the two "A (ace)" and "K (king)" symbols belonging to the predetermined symbol group, payouts for winning combinations, which are set in a payout table in the ROM 108, are compared. When the "A (ace)" symbol has a higher payout than the "K (king)" symbol, the "A (ace)" symbol may be determined to be the specific symbol.

Next, a position of the specific symbol in the symbol column in scrolling is confirmed (Step S3c) and a timing at which the specific symbol in the symbol column in scrolling passes through the display window in the display on the display 16 is calculated from the confirmed position (Step S3d). Thereafter, the sound control circuit 122 shown in FIG. 6 generates a passing sound signal for outputting a passing sound of the symbol from the speaker 29 at the calculated timing, that is, at the timing when the specific symbol passes through the display window in the display on the display 16 (Step S3e).

Note that the specific symbol determined by the procedures in Steps S3a and S3b can also be determined by other procedures. For example, a specific symbol in a unit game started in Step S1 in FIG. 1A may be determined for each unit game among a plurality of symbols forming a symbol column. In this case, the specific symbol for each unit game may be determined either before or after the start of the unit game.

Moreover, instead of determining the specific symbol for each unit game, a predetermined kind of symbol may be set as a specific symbol for all unit games. In such a case, a position of the specific symbol in the symbol column in scrolling and a timing at which the specific symbol passes through a corresponding display window can be previously given.

Furthermore, in the procedures shown in FIG. 1B described above, when a symbol in at least one symbol column which is stopped from scrolling is rearranged in a pattern just before winning combination establishment, a passing sound is outputted from the speaker 29 in synchronization with a timing at which a specific symbol in at least one other symbol column in scrolling passes through the display window. However, the sound control circuit 122 may generate a signal for outputting the passing sound from the speaker 29 at the timing when the specific symbol passes through the display window regardless of whether or not the symbol in at least one symbol column which is stopped from scrolling is rearranged in the pattern just before winning combination establishment.

In such a case, after at least one symbol column is stopped from scrolling, the sound control circuit 122 may generate a signal for outputting the passing sound from the speaker 29 at a timing when the specific symbol in at least one other symbol column in scrolling passes through the corresponding display window. Alternatively, from the stage where all the symbol columns are currently scrolling, the sound control circuit 122 may generate a signal for outputting the passing sound from the speaker 29 in synchronization with a timing at which a specific symbol in each symbol column passes through a corresponding display window.

After the passing sound signal is generated by the sound control circuit 122, the signal generated by the sound control circuit 122 causes the passing sound to be outputted from the speaker 29, the passing sound synchronizing with the timing at which the specific symbol passes through the display window in the display on the display 16, as shown in FIG. 1A (Step S4).

The slot machine 10 and the control method thereof according to the embodiment of the present invention described above enable the player to recognize the timing at which the specific symbol passes through the display window by the passing sound outputted from the speaker 29. The player recognizes that the specific symbol is rearranged in the display window when the symbol column in scrolling is stopped at the timing when the passing sound is outputted from the speaker 29. Therefore, entertainment properties of the gaming machine and the control method thereof can be improved by allowing the player to hopefully expect the symbol column in scrolling to be stopped at the output timing of the passing sound and by increasing the player's expectations for rearrangement of the specific symbol in the display window.

Next, detailed description will be given of the slot machine according to the embodiment of the present invention. As shown in FIG. 2, the slot machine 10 according to this embodiment includes the cabinet 11, a top box 12 provided on the cabinet 11 and a main door 13 provided on the front surface of the cabinet 11. On a front surface of the main door 13, the display 16 is provided. As shown in FIG. 3, the display 16 has twenty partitioned regions q11 to q54 arranged in a matrix pattern including first to fifth columns and first to fourth rows. Moreover, the display 16 includes a liquid crystal panel, which displays symbols rearranged in the partitioned regions q11 to q54 on the display 16.

Note that, in this embodiment, medals are taken as an example of game media to be used for executing games. However, the game media are not limited to the medals but may include, for example, medals, tokens, electronic money and electronic value information (credits) equivalent thereto.

Below the display 16, provided are: various operation switches used by the player to input instructions related to a game process; a coin acceptor 21 for accepting coins; and a bill validator 22 for validating whether or not bills are legitimate and for accepting the legitimate bills. Note that the bill validator 22 may be configured to be capable of reading a bar-coded ticket 39.

Moreover, near the medal insertion slot 21 and the bill validator 22, various operation switches are provided. As the operation switches, a payout switch 23, a MAXBET switch 24, a BET switch 25, a spin repeat bet switch 26 and the start switch 27 are provided.

The BET switch 25 is a switch for determining the number of credits to be bet on a slot game (unit game) to be executed on the display 16. As described later, every time the BET switch 25 is pressed, a credit for 1 medal is bet.

The spin repeat bet switch 26 is a switch for executing the slot game by betting credits again without changing the number of credits bet by use of the BET switch 25 described above in the previous game.

The start switch 27 is a switch for starting the slot game after a desired number of credits are bet. When the start switch 27 is pressed after medals are inserted into the medal insertion slot 21 or credits are bet by use of the BET switch 25, the slot game is started on the display 16.

The payout switch 23 is a switch for providing a payout of inserted medals. The medals to be provided are discharged from a medal payout opening 28 provided open in a lower front portion of the main door 13. The medals provided are accumulated in a medal tray 18.

The MAXBET switch 24 is a switch for betting, in one operation, the maximum number of credits (for example, 30 medals) that can be bet on one game.

On a lower front surface of the main door 13, a foot display 34 is provided, which displays predetermined images based on image display control data included in game software that is being executed. These images include, for example, characters of the slot machine 10, and the like.

On a front surface of the top box 12, an upper display 33 is provided. The upper display 33 includes a liquid crystal panel to display a payout table and the like.

Moreover, the speaker 29 is provided in the top box 12. Below the upper display 33, a ticket printer 35, a card reader 36, a data display 37 and a keypad 38 are provided. The ticket printer 35 prints a bar-code on a ticket and outputs the ticket as the bar-coded ticket 39, the bar-code having coded data such as the number of credits, time, date and an identification number of the slot machine 10.

The player can use the bar-coded ticket 39 to play a game with another slot machine by causing the slot machine to read the bar-coded ticket, or can exchange the bar-coded ticket 39 with bills and the like at a predetermined location in a gaming facility (for example, a cashier in a casino).

The card reader 36 allows a smart card to be inserted thereinto, reads data from the inserted smart card and writes data into the smart card. The smart card is a card carried by the player and stores therein data for identifying the player and data on a record of games played by the player.

The smart card may store therein data corresponding to coins, bills or credits. Moreover, instead of the smart card, a magnetic stripe card may be employed. The data display 37 includes a fluorescent display or the like, and displays, for example, the data read by the card reader 36 and data inputted by the player using the keypad 38.

Moreover, instead of the smart card, an RFID card capable of reading and writing data contactlessly may be used. The keypad 38 is for inputting instructions or data for ticketing and the like.

FIG. 6 is a block diagram showing a control circuit in the slot machine according to this embodiment. A controller 40 shown in FIG. 6 is a microcomputer, including an interface circuit group 102, an I/O bus 104, a CPU 106, a ROM 108, a RAM 110, a communication interface circuit 111, a random number generating circuit 112, a sound control circuit 122, a hopper drive circuit 124, a display drive circuit 128 and a display control circuit 140.

The interface circuit group 102 is connected to the I/O bus 104. The I/O bus 104 inputs and outputs a data signal or an address signal from and to the CPU 106.

The start switch 27 is connected to the interface circuit group 102. A start signal outputted from the start switch 27 is converted into a predetermined signal by the interface circuit group 102 and then transmitted to the CPU 106 through the I/O bus 104.

The BET switch 25, the MAXBET switch 24, the spin repeat bet switch 26 and the payout switch 23 are further connected to the interface circuit group 102. Each of switching signals outputted from the switches 25, 24, 26 and 23 is supplied to the interface circuit group 102, converted into a predetermined signal by the interface circuit group 102 and then transmitted to the CPU 106 through the I/O bus 104.

In addition, a medal sensor 43 is connected to the interface circuit group 102. The medal sensor 43 is a sensor for detecting medals inserted into the medal insertion slot 21 and is provided in a medal insertion part of the medal insertion slot 21. A detection signal outputted by the medal sensor 43 is supplied to the interface circuit group 102, converted into a predetermined signal by the interface circuit group 102 and then transmitted to the CPU 106 through the I/O bus 104.

The ROM 108 storing system programs therein and the RAM 110 for storing various data therein are connected to the I/O bus 104. In the RAM 110, there are provided areas and the like for managing flags and storing various information therein.

The ROM 108 stores a payout table therein. The payout table shows a correspondence relationship between a condition for generating a payout and the number of credits to be provided as a payout when the condition is satisfied. The condition for generating a payout is set by contents of symbols rearranged in the partitioned regions q11 to q54 on the display 16. The contents of the symbols rearranged to generate a payout can be set by the number of scatter symbols rearranged in a slot game or a pattern of a winning combination formed on a payline that is set in the partitioned regions q11 to q54. In the slot game of this embodiment, the CPU 106 determines whether or not to generate a payout (whether or not to provide a payout of credits) and how many credit payouts (the number of credits to be provided as a payout) are provided depending on the payout table and the symbols stopped in the partitioned regions q11 to q54, respectively.

Note that the number of credits to be provided as a payout in the slot game executed during a feature game may be a predetermined number of times (for example, 10 times) larger than the number of credits to be provided as a payout in a normal slot game.

Upon receipt of a game start operation from the start switch 27, the CPU 106 executes a game by reading a game execution program from the ROM 108. The game execution program is a program for executing a slot game on the display 16 through the display control circuit 140.

To be more specific, as the program for executing the slot game, the game execution program is configured to execute the following slot game. Specifically, symbol varying and displaying is performed in the partitioned regions q11 to q54 on the display 16 and then the symbols are stopped. When the symbols are rearranged so as to form a pattern to generate a payout, credits are provided as a payout of the payout number based on the payout table stored in the ROM 108.

The symbols are rearranged for each of first to fifth display windows 16a to 16e on the display 16 shown in FIG. 2, the display windows corresponding to the first to fifth columns shown in FIG. 3, respectively. The rearrangement of the symbols in each of the display windows 16a to 16e can be executed by performing, in each of the display windows 16a to 16e on the display 16, video display in a mode of scrolling and stopping symbol arrays in an arrangement direction of the symbols, the symbol arrays having a plurality of the symbols arranged therein.

The random number generating circuit 112, the communication interface circuit 111, the display control circuit 140, the hopper drive circuit 124, the sound control circuit 122, a counter 127 and the display drive circuit 128 are further connected to the I/O bus 104.

The communication interface circuit 111 is connected to a hall server and the like, and transmits data on a record of plays executed in the slot machine 10 to the hall server. Moreover, the communication interface circuit 111 receives various data transmitted from the hall server.

The random number generating circuit 112 generates a random number for determining whether or not to generate a winning combination or a jackpot in the slot game executed on the display 16.

The counter 127 has a function of counting jackpot bonus resources. When a wager is placed on one slot game with contents that satisfy a predetermined condition, the jackpot bonus resources counted by the counter 127 are accumulated according to a part of the wager. Note that the counter 127 can also be set inside the RAM 110.

The display drive circuit 128 performs control of displaying the number of payouts in a payout number partitioned region 48 set in the lower left area of the display 16.

The sound control circuit 122 outputs sound data to the speaker 29. Specifically, the CPU 106 reads sound data stored in the ROM 108 and transmits the sound data to the sound control circuit 122 through the I/O bus 104. The sound data stored in the ROM 108 is data for specifying the kinds of the symbols included in the symbol array. Under the control of the sound control circuit 122 that has received the sound data from the ROM 108, predetermined effect sounds corresponding to symbols expressed by the sound data received are emitted from the speaker 29.

Figure 7A:
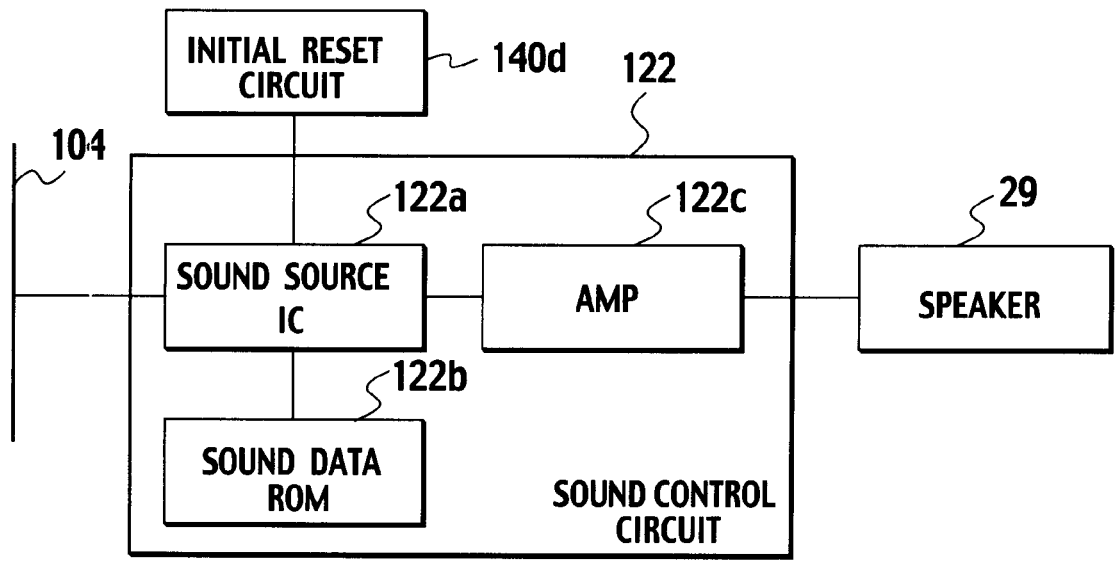
FIG. 7A is a block diagram showing a sound control circuit in the slot machine according to the embodiment of the present invention.

Moreover, as shown in FIG. 7A, the sound control circuit 122 includes: a sound source IC 122a configured to perform control related to sounds; a sound data ROM 122b configured to store therein sound data on various effect sounds including BGM; an amplifier 122c (hereinafter referred to as an AMP) for amplifying a sound signal; and the like.

The sound source IC 122a is connected to the sound data ROM 122b, the AMP 122c and an initial reset circuit 140d configured to generate a reset signal when power is turned on. Moreover, the sound source IC 122a is also connected to the CPU 106 through the I/O bus 104. The sound source IC 122a controls sounds to be emitted from the speaker 29.

The data stored in the sound data ROM 122b is data on passing sounds as effect sounds when symbols in the symbol array pass through the corresponding display windows 16a to 16e in scrolling of a symbol array. Contents of the passing sound data vary depending on the kinds of the symbols.

The sound source IC 122a reads, from the sound data ROM 122b, data on symbols corresponding to the sound data that the CPU 106 reads from the ROM 108 and notifies to the sound source IC 122a, and converts the data into an analog signal. Thereafter, the analog signal is amplified by the AMP 122c and then outputted to the speaker 29. Thus, passing sounds corresponding to the symbols notified by the CPU 106 can be outputted from the speaker 29.

Figure 7B:
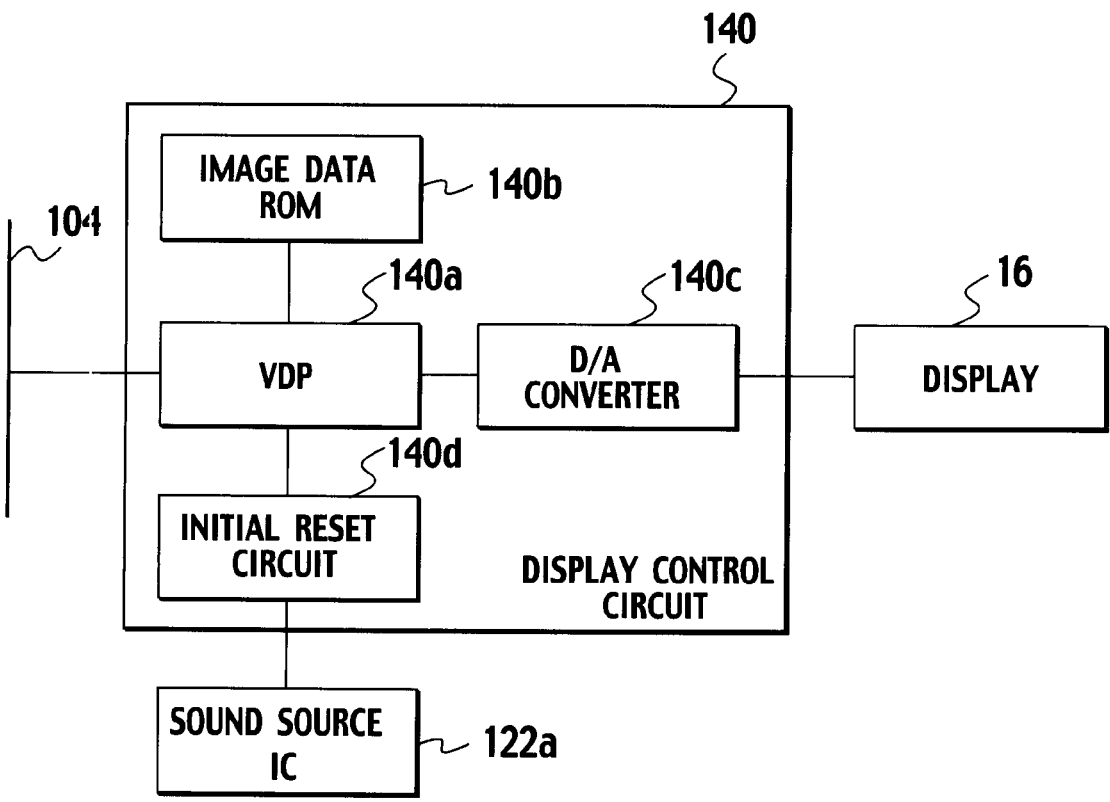
FIG. 7B is a block diagram showing a display control circuit in the slot machine according to the embodiment of the present invention.

Note that, as the initial reset circuit 140d, the one provided in the display control circuit 140 shown in FIG. 7B is shared.

As shown in FIG. 6, the hopper drive circuit 124 outputs a payout signal to the hopper 44 when a payout is generated. Specifically, when a payout signal is inputted by the payout switch 23, the CPU 106 outputs a drive signal to the hopper drive circuit 124 through the I/O bus 104. Thus, the hopper 44 provides a payout of medals equivalent to the number of credits remaining at the time, which is stored in a predetermined memory region of the RAM 110.

The display control circuit 140 performs display control for executing an effect corresponding to a slot game and an outcome of the slot game on the display 16. Specifically, the CPU 106 generates an image display command signal corresponding to a state of the slot game and the outcome of the slot game, and outputs the image display command signal to the display control circuit 140 through the I/O bus 104. Upon receipt of the image display command signal outputted by the CPU 106, the display control circuit 140 generates an image signal for driving the display 16 based on the image display command, and outputs the generated image signal to the display 16. Thus, an effect screen corresponding to the slot game and the outcome thereof is displayed on the display 16.

As shown in FIG. 7B, the display control circuit 140 includes a VDP 140a, an image data ROM 140b configured to store various image data, a D/A converter 140c configured to convert the image data into image signals, and an initial reset circuit 140d.

The VDP 140a described above is connected to the image data ROM 140b, the D/A converter 140c and the initial reset circuit 140d. Moreover, the VDP 140a is also connected to the CPU 106 through the I/O bus 104.

The VDP 140a includes circuits such as a so-called sprite circuit, a screen circuit and a palette circuit, and can perform various kinds of processing for displaying images on the display 16. Specifically, the VDP 140a performs display control for the display 16. Moreover, the VDP 140a includes a storage medium (for example, a video RAM) as a buffer for displaying images of the symbol columns in the display windows 16a to 16e on the display 16. By storing the image data in a predetermined storage area of the storage medium, the images of the symbol columns are displayed in the display windows 16a to 16e on the display 16 at a predetermined timing.

The image data ROM 140b separately stores therein various image data such as the image data on the symbols (the nine kinds of symbols including "A (ace)," "K (king)," "Q (queen)," "J (jack)," "10," "umbrella," "cloud," "FEATURE" and "WILD") which are included in the respective symbol arrays.

In response to an image display command provided from the CPU 10E, the VDP 140a reads the various image data, such as image data on the symbols, from the image data ROM 140b and generates image data on the symbol columns to be displayed in the display windows 16a to 16e on the display 16. The VDP 140a stores the generated image data on the symbol columns in the display windows 16a to 16e in the buffer with the display windows 16a to 16e arranged side by side and supplies the data to the D/A converter 140c at a predetermined timing. The D/A converter 140c converts the image data into a video signal and supplies the video signal to the display 16, thereby displaying images on the display 16.

As shown in FIG. 6, the CPU 106 outputs, to the display control circuit 140, an image display command for displaying an image of the slot game and an effect image corresponding to the outcome of the slot game on the display 16 at a timing corresponding to a course of the slot game. Accordingly, an effect corresponding to the slot game and the outcome thereof is displayed on the display 16.

Figure 8:
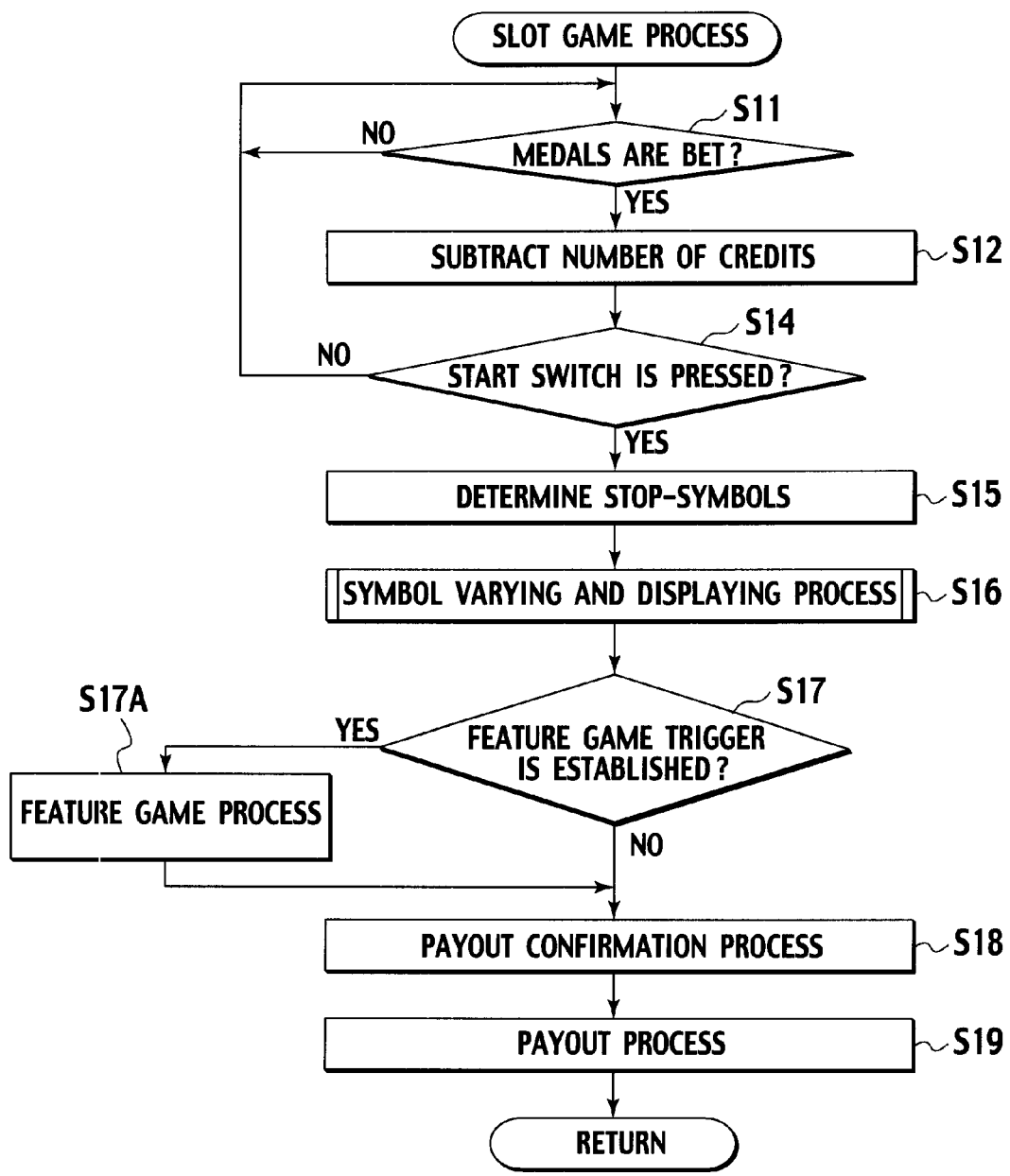
FIG. 8 is a flowchart showing a procedure of processing executed by the slot machine according to the embodiment of the present invention.

Next, with reference to a flowchart shown in FIG. 8, operations of the slot machine according to this embodiment will be described. FIG. 8 is the flowchart showing a procedure of slot game processing executed by the CPU 106 shown in FIG. 6 according to the game execution program stored in the ROM 108.

First, in a slot game process shown in FIG. 8, the CPU 106 determines whether or not credits are bet in Step S11. In this step, the CPU 106 determines whether or not a signal outputted from the BET switch 25 or a signal outputted from the MAXBET switch 24 is received. Specifically, the signals are outputted respectively when the BET switch 25 is pressed and when the MAXBET switch 24 is pressed. When the CPU 106 determines that no credits are bet, the process returns to Step S11.

Meanwhile, in Step S11, when the CPU determines that the credits are bet, the CPU 106 moves to Step S12 and reduces the number of credits stored in the RAM 110 according to the number of the credits bet.

Next, in Step S14, the CPU 106 determines whether or not the start switch 27 is pressed. In this step, the CPU 106 determines whether or not a signal outputted from the start switch 27 when the start switch 27 is pressed is received.

When the CPU determines that the start switch 27 is not pressed, the CPU 106 returns the processing to Step S11. Note that, in the case where the start switch 27 is not pressed (for example, the case where an instruction to finish the game is inputted without pressing the start switch 27), the CPU 106 cancels a result of reduction in the number of credits in Step S12.

Meanwhile, in Step S14, when the CPU determines that the start switch 27 is pressed, the CPU 106 moves from Step S14 to Step S15 and determines stopped symbols. In this stopped-symbol determination processing, the CPU 106 determines the symbols to be stopped and displayed (rearranged) in the respective partitioned regions q11 to q54 by executing a stopped-symbol determination program that is one of the game execution programs stored in the ROM 108.

In the stopped-symbol determination processing described above, the CPU 106 executes a random number generating program to select a random number value from among values in a range of "0 to 255" for each of the partitioned regions q11 to q54, and determines a stopped symbol for each of the partitioned regions q11 to q54 by referring to correspondence between the random number value and the symbol stored in the ROM 108.

By the stopped-symbol determination processing, each of the symbols to be rearranged in each of the partitioned regions q11 to q54 in the first to fifth columns shown in FIG. 3 is determined to be any one of nine kinds of symbols shown in FIG. 4, including "A (ace)," "K (king)," "Q (queen)," "J (jack)," "10," "umbrella," "cloud," "FEATURE" and "WILD."

Next, the CPU 106 performs processing of symbol varying and displaying in Step S16. In this processing, symbol varying and displaying is started and then stopped in the partitioned regions q11 to q54. By this processing of starting and stopping the symbol varying and displaying, the symbols are rearranged in the partitioned regions q11 to q54. Details will be described with reference to a flowchart of FIG. 9.

When the symbol varying and displaying is finished, the CPU 106 moves to Step S17 and determines whether or not a feature game trigger is established by the symbols rearranged in the partitioned regions q11 to q54. When the feature game trigger is established, feature game processing is executed (Step S17A). In the feature game processing, executed are, for example, slot games the number of which is determined by an option selection operation to be performed by the player at the start of the feature game.

When the feature game processing in Step S17A is finished or where the feature game trigger is not established (NO) in Step S17, the CPU 106 moves to Step S18 and executes payout confirmation processing. In this processing, the CPU 106 determines whether or not the symbols rearranged in the partitioned regions q11 to q54 in the slot game executed form a pattern that wins an award.

The slot game to be determined here is basically the slot game previously executed. However, when the feature game processing in Step S17A is finished, all the slot games executed in the feature game processing are to be determined on whether or not the symbols form a pattern that wins an award.

In the case where the slot machine 10 is the one that executes the scatter type unit game, the CPU 106 determines whether or not a predetermined number or more of scatter symbols of the same kind are rearranged in the partitioned regions q11 to q54. Moreover, in the case where the slot machine 10 is the one that executes the winning combination type unit game, the CPU 106 determines whether or not a winning combination is formed on a payline set in the partitioned regions q11 to q54.

When the symbols rearranged in the partitioned regions q11 to q54 form a pattern that wins an award, the number of credits to be provided as a payout is determined according to the payout table stored in the ROM 108. The payout table used for determining the number of credits to be provided as a payout varies depending on whether the slot game in which an award is established is a normal slot game or a slot game during a feature game. Moreover, when awards are won in a plurality of slot games during the feature game, a sum of payouts to be provided is determined as the number of credits to be provided as a payout.

In Step S19, the CPU 106 executes processing of providing a payout of credits corresponding to a result of the payout content confirmation in Step S18 described above. In this payout processing, the CPU 106 adds the number of credits set in Step S31 to the number of credits stored in the RAM 110. After the payout processing, the CPU 106 returns to Step S11 described above to execute next slot game processing.

Figure 9:
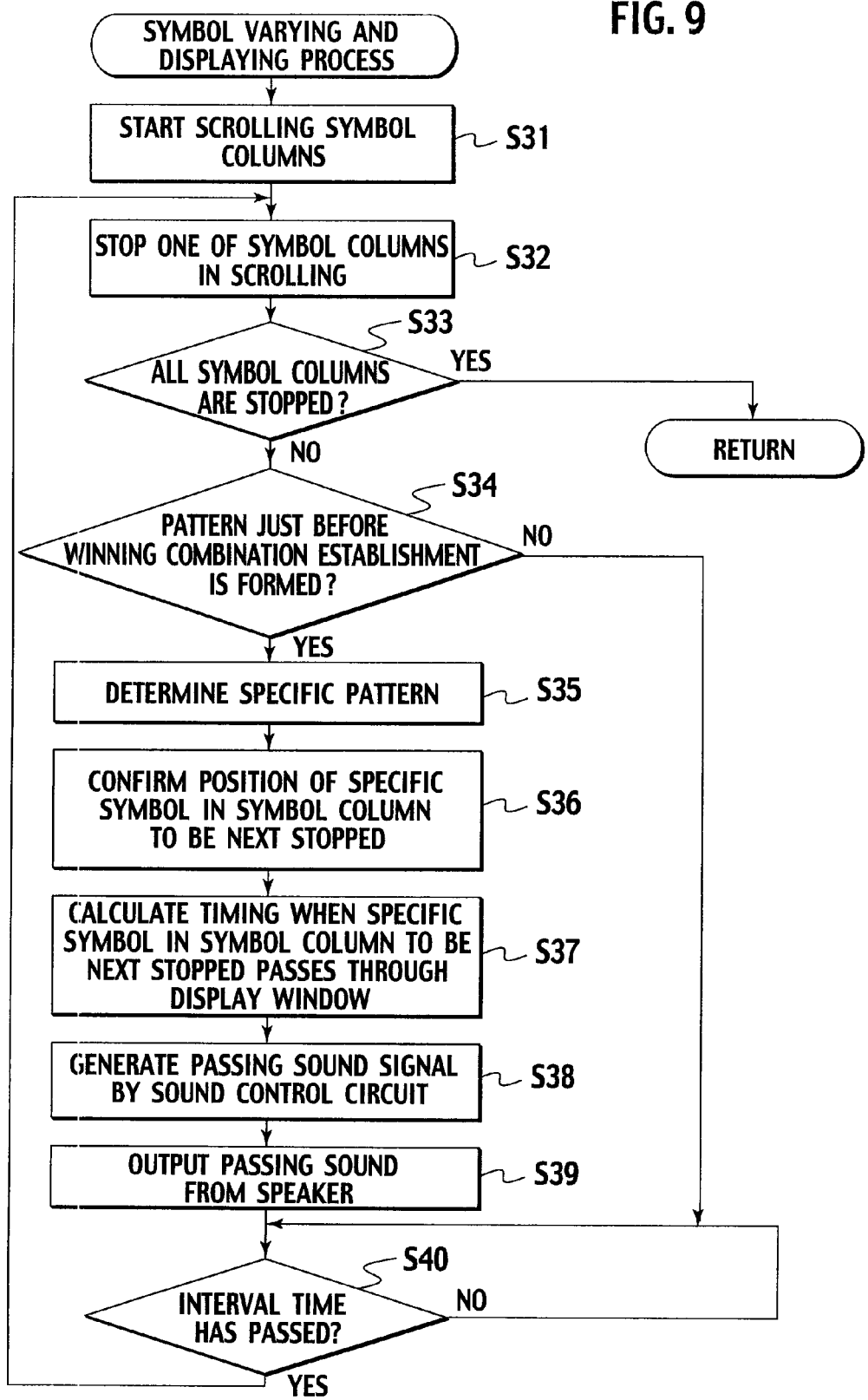
FIG. 9 is a flowchart showing a procedure of processing executed by the slot machine according to the embodiment of the present invention.

FIG. 9 is a flowchart showing detailed procedures of the symbol varying and displaying process in Step S16 shown in FIG. 8. First, in Step S31, the CPU 106 uses video images displayed on the display 16 by the display control circuit 140 to start scrolling of the symbol columns in the first to fifth display windows 16a to 16e. Next, the CPU 106 uses the video images displayed on the display 16 by the display control circuit 140 to stop one of the symbol columns in scrolling (Step S32).

Thereafter, the CPU 106 determines whether or not all the symbol columns in the first to fifth display windows 16a to 16e are stopped from scrolling (Step S33). When all the symbol columns are stopped from scrolling (YES in Step S33), the CPU 106 terminates the symbol varying and displaying process. On the other hand, when all the symbol columns are not stopped from scrolling (NO in Step S33), the CPU 106 determines whether or not symbols rearranged in some of the partitioned regions q11 to q54 by the symbol column which is stopped from scrolling form the pattern just before winning combination establishment described above as an example with reference to FIGS. 5A to 5D (Step S34).

The pattern just before winning combination establishment is not formed (NO in Step S34), the CPU 106 moves to Step S40 to be described later. On the other hand, when the pattern just before winning combination establishment is formed (YES in Step S34), the CPU 106 determines a symbol required to be rearranged to establish a winning combination by stopping the symbol column in scrolling, as a specific symbol (Step S35).

Next, the CPU 106 confirms a position of the determined specific symbol in the symbol column in scrolling (Step S36) and calculates a timing at which the specific symbol in the symbol column in scrolling passes through the display window in the display on the display 16 from the confirmed position (Step S37). Thereafter, the CPU 106 causes the sound control circuit 122 to generate a passing sound signal for outputting a passing sound corresponding to the specific symbol from the speaker 29 at the calculated timing, that is, at the timing when the specific symbol passes through the display window in the display on the display 16 (Step S38).

Next, the CPU 106 uses the signal generated by the sound control circuit 122 to output the passing sound from the speaker 29, the passing sound synchronizing with the timing at which the specific symbol passes through the display window in the display on the display 16 (Step S39).

In Step S40, the CPU 106 determines whether or not an interval time has passed, the interval time being an idle time before a next symbol column in scrolling is stopped. When the interval time has not passed (NO in Step S40), the CPU 106 repeats Step S40 until the interval time passes. When the interval time has passed (YES in Step S40), the CPU 106 moves to Step S32.

In the slot machine 10 according to this embodiment thus configured, when the symbol rearranged in the partitioned region in at least one display window forms the pattern just before winning combination establishment in the slot game, the signal generated by the sound control circuit 122 causes a passing sound to be outputted from the speaker 29 in synchronization with a timing at which the specific symbol passes through at least one display window. Specifically, the kind of the passing sound corresponds to the kind of a specific symbol to be rearranged in the remaining partitioned region to establish a winning combination.

Therefore, with the passing sound outputted from the speaker 29, the player of the slot machine 10 can recognize the timing at which the symbol to establish a winning combination existing in the symbol column in scrolling passes through the display window. Thus, the player recognizes that the specific symbol is rearranged in the display window when the symbol column in scrolling is stopped at the timing when the passing sound is outputted from the speaker 29. Therefore, entertainment properties of the gaming machine and the control method thereof can be improved by allowing the player to hopefully expect the symbol column in scrolling to be stopped at the output timing of the passing sound and by increasing the player's expectations for rearrangement of the specific symbol in the display window.

Although the gaming machine and the control method thereof according to the present invention have been described above based on the illustrated embodiment, the present invention is not limited thereto. The configurations of the parts can be replaced with any configurations having the same functions.

For example, although, in the above embodiment, the content of the passing sound varies depending on the kind of the symbol, the same passing sound may be used for all the symbols.

Moreover, although, in the above embodiment, the symbol columns are stopped from scrolling one by one in the slot game, multiple symbol columns may be simultaneously stopped from scrolling first and then one or more remaining symbol columns may be stopped from scrolling.

Furthermore, in the above embodiment, the description has been given of the case where the display 16 is composed of the twenty partitioned regions q11 to q54 in the five columns and the four rows. However, the number of the partitioned regions to be arranged in the matrix pattern on the display is arbitrary in both of the column and row directions.

Moreover, in the above embodiment, the description has been given of the slot machine 10 for playing the scatter type or winning combination type slot games. However, the present invention can also be applied, for example, to a gaming machine for playing a card game such as poker, in which whether or not a winning combination is established or a grade of the established winning combination is determined based on contents of card symbols "A (ace)", "K (king)", "Q (queen)", "J (jack)" and "10" rearranged on a payline.

In addition, in the detailed description above, the characteristic portions are mainly described in order to make the present invention easily understandable. The present invention is not limited to the embodiments described in the detailed description above, and can be applied to the other embodiments, and its range of application is wide. Also, the terms and the terminology used in the present specification are used only for the purpose of explaining the present invention precisely, and not used for the purpose of limiting the interpretation of the present invention. Also, for those skilled in the art, it should be easy to contemplate other configurations, systems, methods, etc., that are contained in the concept of the present invention, from the content of the invention described in the present specification. Consequently, the description of the scope of claims should be construed as containing equivalent configurations within a range of not deviating from a range of the technical ideas of the present invention. Also, the purpose of the abstract is to make it possible for the patent office, the general public organizations, and technicians and the like who belong to the present technical field and who are not thoroughly familiar with patent and law terms or specialized terms, to quickly judge the technical content and its essence of the present application by a simple search. Consequently, the abstract is not intended to limit the scope of the invention which should be evaluated by the description of the scope of claims. Also, in order to sufficiently understand the purpose of the present invention and the effects specific to the present invention, they should preferably be interpreted by sufficiently referring to the documents and the like that are already disclosed in public.

Also, the detailed description above contains the processing to be executed by a computer. The explanations and expressions in the above are described for the purpose of facilitating the most efficient understanding by those skilled in the art. In the present specification, each step used in deriving one result should be understood as a processing without a self-contradiction. Also, at each step, transmission and reception, recording, etc., of electric or magnetic signals will be carried out. In the processing at each step, such signals are expressed by bits, values, symbols, letters, terms, numbers, etc., but it should be noted that they are used simply because they are convenient for the purpose of explanation. Also, there are cases where the processing at each step is described by an expression common to the human behavior, but the processing described in the present specification is to be executed by various devices in principle. Also, the other configuration required in carrying out each step will be obvious from the above description.

What is claimed is:

1. A gaming machine comprising:
a display including a first display window and a second display window and configured to display a plurality of symbols including a first set of symbols and a second set of symbols, the first set of symbols scrolling and stopping to show a subset of the first set of symbols in the first display window, the second set of symbols scrolling and stopping to show a subset of the second set of symbols in the second display window, the first set of symbols and the second set of symbols stopping at different times in a respective unit game;
a random number generator generating a random number;
a speaker configured to output a first passing sound of a first specific symbol of the plurality of symbols;
a sound control circuit configured to generate a first signal of the first passing sound to be outputted from the speaker;
an input device configured to receive a physical item representing a monetary value provided by a player; and
a controller configured to
(a) convert the physical item into a credit to be bet by the player,
when the subset of the first set of symbols stops in the first display window while the second set of symbols are scrolling in the second display window in the respective unit game, determine whether there is a first symbol in the second set of symbols forming a first winning combination along with the subset of the first set of symbols based on the random number when the first symbol stops in the second display window,
(c) when determining that the first symbol forms the first winning combination when the first symbol stops in the second display window, determine whether the first symbol is the first specific symbol,
(d) when determining that the first symbol is the first specific symbol, find a position of the first specific symbol in scrolling and calculate a timing at which the first specific symbol in scrolling passes through the second display window from a position of the first specific symbol;
(e) drive the sound control circuit to generate the first signal of the first passing sound according to the calculated timing;
(f) drive the speaker to output the first passing sound in synchronization with the calculated timing, in response to the first signal of the first passing sound generated by the sound control circuit;
(g) determine whether a time period elapses from the stop of the subset of the first set of symbols;
(h) when determining that the time period elapses from the stop of the subset of the first set of symbols, stop the second set of symbols in the second display window; and
(i) adjust the credit based on a bet amount bet by the player and a result of the respective unit game.

2. The gaming machine according to claim 1, wherein the speaker is configured to output a second passing sound of a second specific symbol of the plurality of symbols, the sound control circuit is configured to generate a second signal of the second passing sound to be outputted from the speaker
the second specific symbol is different in kind from the first specific symbol, and
the controller is configured to
determine whether there is a second symbol in the second set of symbols forming a second winning combination when the second symbol stops in the second display window in a state that the subset of the first set of symbols stop in the first display window while the second set of symbols are scrolling in the second display window in the respective unit game,
determine whether the second symbol is the second specific symbol when determining that the second symbol forms the second winning combination when the second symbol stops in the second display window,
drive the sound control circuit to generate the first signal of the first passing sound and the second signal of the second passing sound having different contents from the first passing sound, and
drive the speaker to output the first passing sound in synchronization with a timing at which the first specific symbol passes through the second display window, in response to the first signal of the first passing sound and to output the second passing sound in synchronization with a timing at which the second specific symbol passes through the second display window, in response to the second signal of the second passing sound.

3. The gaming machine according to claim 1, wherein the controller is configured to determine the first specific symbol for the respective unit game.

4. The gaming machine according to claim 3, wherein
the speaker is configured to output a second passing sound of a second specific symbol of the plurality of symbols,
the sound control circuit is configured to generate a second signal of the second passing sound to be outputted from the speaker
the second specific symbol is different in kind from the first specific symbol, and
the controller is configured to
determine whether there is a second symbol in the second set of symbols forming a second winning combination when the second symbol stops in the second display window in a state that the subset of the first set of symbols stop in the first display window while the second set of symbols are scrolling in the second display window in the respective unit game,
determine whether the second symbol is the second specific symbol when determining that the second symbol forms the second winning combination when the second symbol stops in the second display window,
drive the sound control circuit to generate the first signal of the first passing sound and the second signal of the second passing sound having different contents from the first passing sound, and
drive the speaker to output the first passing sound in synchronization with a timing at which the first specific symbol passes through the second display window, in response to the first signal of the first passing sound and to output the second passing sound in synchronization with a timing at which the second specific symbol passes through the second display window, in response to the second signal of the second passing sound.

5. A gaming machine comprising:
a display including a first display window and a second display window and configured to display a plurality of symbols including a first set of symbols and a second set of symbols, the first set of symbols scrolling and stopping to show a subset of the first set of symbols in the first display window, the second set of symbols scrolling and stopping to show a subset of the second set of symbols in the second display window in a respective unit game;
a random number generator generating a random number;
a speaker configured to output a first passing sound of a first specific symbol of the plurality of symbols;
a sound control circuit configured to generate a first signal of the first passing sound to be outputted from the speaker;
an input device configured to receive a physical item representing a monetary value provided by a player; and
a controller configured to
   (a) convert the physical item into a credit to be bet by the player,
   (b) display the first set of symbols and the second set of symbols stopping at different timings in the respective unit game,
   (c) when the subset of the first set of symbols stop in the first display window while the second set of symbols is scrolling in the second display window in the respective unit game, determine whether there is at least one symbol in the second set of symbols forming a first winning combination along with the subset of the first set of symbols based on the random number when a first symbol stops in the second display window,
   (d) when determining that the at least one symbol forms the first winning combination when the at least one symbol stops in the second display window, determine whether a number of the at least one symbol is two or more,
   (e) when determining that the number of the at least one symbol is two or more, determine whether one of the at least one symbol which forms a highest winning pattern when stopped in the second display window is the first specific symbol,
   (f) drive the sound control circuit to generate the first signal of the first passing sound according to a timing at which the first specific symbol passes through the second display window in the respective unit game when it is determined that one of the at least one symbol which forms the highest winning pattern when stopped in the second display window is the first specific symbol,
   (g) drive the speaker to output the first passing sound in synchronization with the timing at which the first specific symbol passes through the second display window, in response to the first signal of the first passing sound generated by the sound control circuit;
   (h) determine whether a time period elapses from the stop of the subset of the first set of symbols;
   (i) when determining that the time period elapses from the stop of the subset of the first set of symbols, stop the second set of symbols in the second display window; and
   (j) adjust the credit based on a bet amount bet by the player and a result of the respective unit game.

6. The gaming machine according to claim 5, wherein the speaker is configured to output a second passing sound of a second specific symbol of the plurality of symbols,
the sound control circuit is configured to generate a second signal of the second passing sound to be outputted from the speaker
the second specific symbol is different in kind from the first specific symbol, and
the controller is configured to
   determine whether there is a second symbol in the second set of symbols forming a second winning combination when the second symbol stops in the second display window in a state that the subset of the first set of symbols stop in the first display window while the second set of symbols are scrolling in the second display window in the respective unit game,
   to determine whether the second symbol is the second specific symbol when determining that the second symbol forms the second winning combination when the second symbol stops in the second display window,
   drive the sound control circuit to generate the first signal of the first passing sound and the second signal of the second passing sound having different contents from the first passing sound, and
   drive the speaker to output the first passing sound in synchronization with a timing at which the first specific symbol passes through the display window, in response to the first signal of the first passing sound and to output the second passing sound in synchronization with a timing at which the second specific symbol passes through the second display window, in response to the second signal of the second passing sound.

7. A method for controlling a gaming machine that displays a plurality of symbols including a first set of symbols and a second set of symbols, the first set of symbols scrolling and stopping to show a subset of the first set of symbols in the first display window, the second set of symbols scrolling and stopping to show a subset of the second set of symbols in the second display window, the method comprising:
   receiving a physical item representing a monetary value provided by a player through an input device;
   converting the physical item into a credit to be bet by the player;
   when the subset of the first set of symbols stop in the first display window while the second set of symbols are scrolling in the second display window in the respective unit game, determining whether there is a first symbol in the second set of symbols forming a first winning combination along with the subset of the first set of symbols based on a random number generated by a random number generator when the first symbol stops in the second display window,
   when determining that the first symbol forms the first winning combination when the first symbol stops in the second display window, determining whether the first symbol is a first specific symbol,
   driving a sound control circuit to generate a first signal of a first passing sound of the first specific symbol according to a timing at which the first symbol passes through the second display window during scrolling of the second set of symbols in the respective unit game when it is determined that the first symbol is the specific symbol;
   driving a speaker to output the first passing sound in synchronization with the timing at which the first symbol passes through the second display window, in response to the first signal of the first passing sound generated by the sound control circuit;

determining whether a time period elapses from a stop of the subset of the first set of symbols;

when determining that the time period elapses from the stop of the subset of the first set of symbols, stopping the second set of symbols in the second display window; and adjusting the credit based on a bet amount bet by the player and a result of the respective unit game.

8. The method for controlling the gaming machine, according to claim 7, further comprising:

determining whether there is a second symbol in the second set of symbols forming a second winning combination when the second symbol stops in the second display window in a state that the subset of the first set of symbols stop in the first display window while the second set of symbols are scrolling in the second display window, determining whether the second symbol is a second specific symbol when determining that the second symbol forms the second winning combination when the second symbol stops in the second display window, driving the sound control circuit to generate the first signal of the first passing sound and a second signal of a second passing sound having different contents from the first passing sound; and driving the speaker to output the first passing sound in synchronization with a timing at which the first specific symbol passes through the second display window, in response to the first signal of the first passing sound and to output the second passing sound in synchronization with a timing at which the second specific symbol passes through the second display window, in response to the second signal of the second passing sound.

\* \* \* \* \*